Feb. 4, 1936.  E. A. ROCKWELL  2,029,637
COMBINED FREEWHEELING AND POWER BRAKE UNIT
Filed Feb. 10, 1933   4 Sheets-Sheet 3

Inventor:
Edward A. Rockwell,

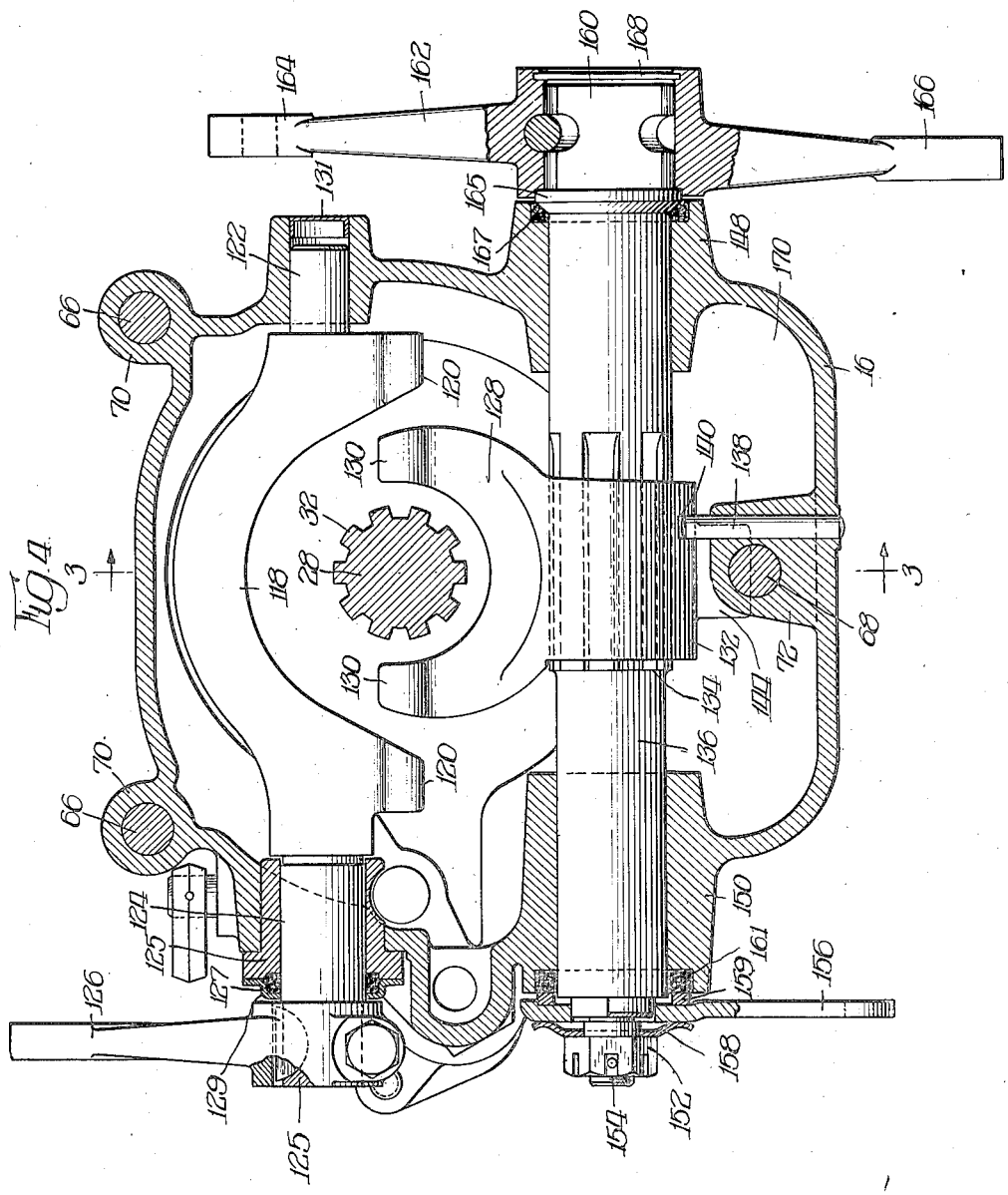

Patented Feb. 4, 1936

2,029,637

UNITED STATES PATENT OFFICE 2,029,637

COMBINED FREEWHEELING AND POWER BRAKE UNIT

Edward A. Rockwell, New York, N. Y.

Application February 10, 1933, Serial No. 656,091

4 Claims. (Cl. 188—140)

This invention relates to improvements in a combined free wheeling and power brake unit for motor vehicles. The improvements are particularly directed to the design of the casing and the arrangement of the parts therein which are adapted for association with the propeller shaft of a motor vehicle immediately in rear of the usual transmission.

Previous disclosures have been made of power brake devices for motor vehicles according to which the pressure applied by the operator to the usual brake pedal is amplified through the momentum of the vehicle derived from rotation of the propeller shaft and the amplified force utilized in applying the wheel brakes on all four wheels of the motor vehicle. Motor vehicles having so-called free wheeling devices have now come into extensive use. In such a vehicle the propeller shaft or driven shaft of the vehicle is entirely free to rotate faster than the speed at which it is being driven from the engine whereby the engine does not act as a brake to retard the momentum of the vehicle. When a free wheeling unit is employed it is all the more desirable that the braking system of the vehicle be fully adequate to smoothly and quickly stop the vehicle.

It is a purpose of the present invention to disclose an arrangement according to which a power brake unit is associated with a free wheeling unit whereby the power brake unit is always in readiness for actuation so long as the vehicle is in motion.

It is further an object of the present invention to combine the free wheeling unit and the power brake unit in the same casing which may be associated with the propeller shaft immediately in rear of the transmission of the vehicle.

It is further an object of the present invention to design the parts of the free wheeling power brake unit in such a manner that a compact arrangement is obtained while at the same time preserving the desired strength and capacity of the parts to carry out their intended functions and further to enable convenient assembly of the parts and replacement thereof if found to be necessary.

It is a still further object of the invention to provide a fairly stiff return spring for normally holding the power brake parts in released positions and to connect the emergency lever to the brake linkage in such a manner that the operator does not need to overcome the force of the stiff return spring when the brakes are manually set for parking.

Further objects and advantages of the present improvements will be more readily apparent from the following description taken in connection with the attached drawings, in which Figure 1 is an elevation taken from one side of the power brake unit and controls therefor, a portion of the support being shown in section;

Figure 4 is a transverse section taken through the power brake unit.

Figure 3:
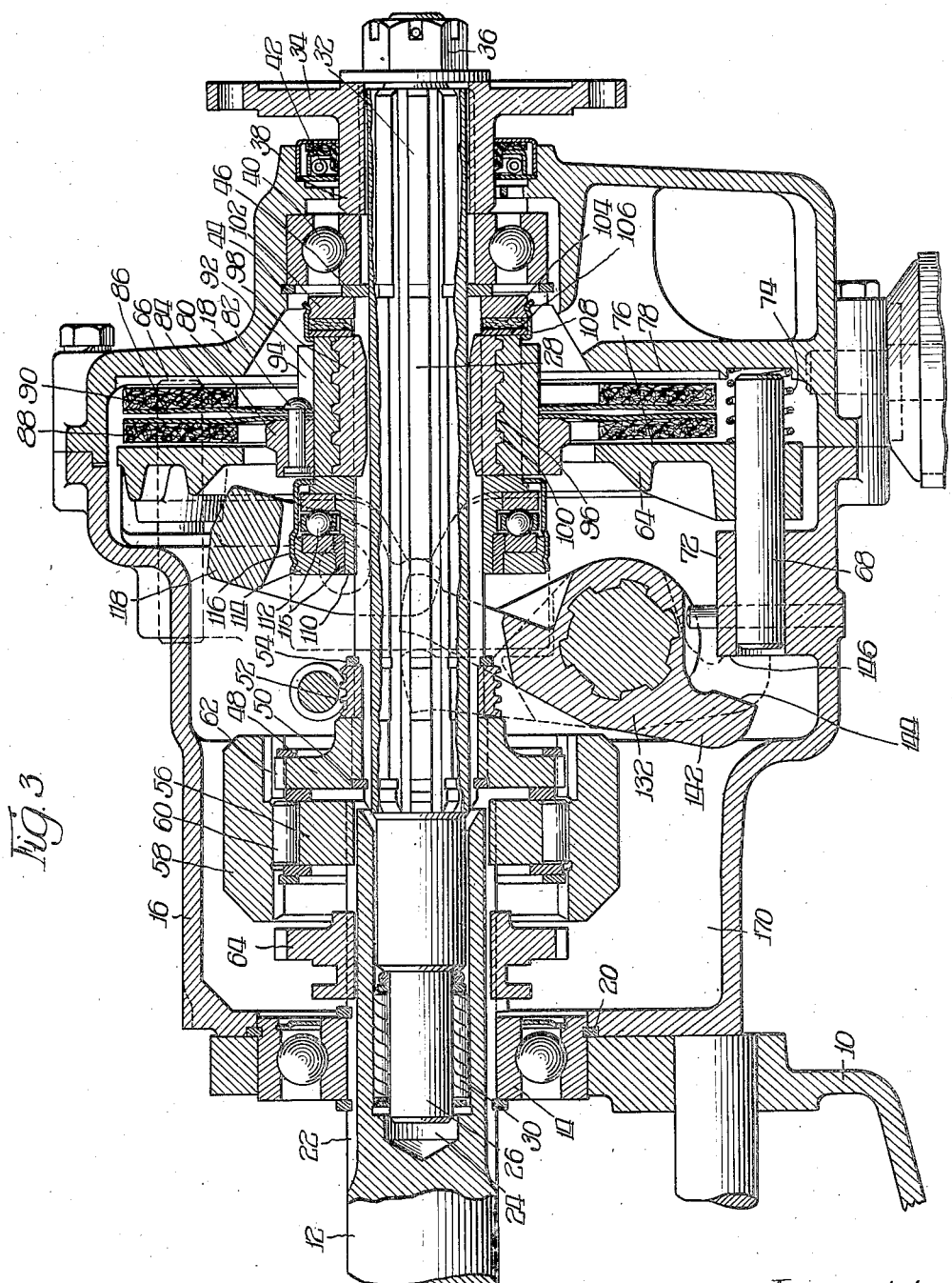
Figure 3 is a longitudinal section taken through the power brake unit.

In the drawings, referring particularly to Figure 3, a portion of the transmission casing is indicated 10. The transmission driving shaft 12 extends through the rear wall of the transmission casing 10 and is rotatably supported by the ball-bearing unit 14. The casing for the power brake and the free wheeling unit is composed of two parts, a body casing 16 and an end cover 18. The casing part 16 is secured to the transmission casing 10 and serves to hold the bearing 14 in place by a ring 20. The end of the shaft 12 which protrudes into the casing 16 is formed with exterior straight splines 22 and is counter-bored as at 24 to receive a reduced end 26 of the drive shaft 28.

The end 26 of drive shaft 28 is supported by the roller bearings 30 which are received in the counter-bored portion 24 of the shaft 12 and surround the end 26 of the shaft 28. The shaft 28 is provided with straight exterior splines 32. A flanged drive collar 34 is secured to the rear end of the shaft 28 by nut 36. The hub 38 of the flanged collar 34 is forced into abutment with the inner race ring of a ball bearing unit 40 which supports the rear end of shaft 28 for rotation in the cover part 18 of the casing. An oil sealing unit 42 is positioned in the open end of the casing part 18 to surround the hub 38 of the flange drive collar 34 in sealing relation therewith.

The outer race ring of the ball bearing unit 40 is held in position by a ring 44 seated in a groove of the casing part 18 and the inner race ring of the ball bearing unit 40 is forced by the hub 38 against a ring 46 carried in a groove of the shaft 28.

The shaft 12 is connected to the shaft 28 through a free wheeling unit, which may be of any desirable construction, but, as partially disclosed, includes a gear member 48 splined to the shaft 28, held in position by a ring 50 seated in a groove of shaft 28 and serving to retain and position the speedometer worm 52 which abuts against the rear side of member 48 and is retained in position by a ring 54 carried by a groove in shaft 28.

The shaft 12 carries a drive member 56 which is adapted to transmit rotation in one direction only to internal gear member 58 through locking rollers 60. The gear 58 is in mesh at its rear end with gear 48 through teeth 62. A slidable gear 64 is adapted to be moved to lock the free wheeling unit and positively transmit rotation from shaft 12 to shaft 28 in either direction of rotation. It will be noted that the free wheeling unit occupies a space in the casing part 16 immediately in the rear of the transmission casing 10.

A non-rotatable laterally movable brake plate 65 is mounted within the casing upon a pair of pins 66 at the top and a single pin 68 at the bottom. The upper pins 66 are supported in bosses 70 formed on the casing part 16 while the lower pin is received in the boss 72, also formed on the casing part 16. Compression springs, such as the spring 74, may be positioned to surround the pins 68 and 66 and to react between the casing part 18 and the brake plate 64 to hold the brake plate normally in released position. The brake plate 64 has a friction surface 76 opposed to the friction surface 78 formed on the casing part 18.

A normally rotatable but retardable braking member is positioned between the friction surfaces 76 and 78 and is composed of a hub 80 having secured thereto by rivets 82 a pair of disk members 84—86 which have attached to their marginal edges a pair of fabric friction rings 88 and 90. It will be apparent that the lateral movement of the brake plate 64 will serve to frictionally retard the rotation of the braking element by gripping the friction rings 88 and 90 between the friction surfaces 76—78. The hub 80 is supported by and keyed for relative axial movement with respect to a sleeve 92 having exterior straight splines 94 and having an interior spiral thread 96. The spiral sleeve 92 is coupled to an inner sleeve 98 having an exterior spiral thread 100. The inner spiral sleeve 98 is mounted on and keyed for axial movement with respect to the shaft 28. Thrust collars are mounted adjacent the opposite ends of the spiral sleeves 92 and 98. Thus, at the rearward ends of the sleeves there is positioned a thrust collar unit composed of a ring 102 mounted to abut against the locking ring 46. On the forward side of the ring 102 is a cushioning element, such as a leather ring 104, and finally a pressure receiving ring 106. The rings 102—104—106 are held together by an annular clamping member 108. Adjacent the forward ends of the sleeves 92—98 is a thrust collar unit composed of a supporting ring 110 having a face adapted to contact the forward ends of the sleeves 92—98 and serving as a mounting for the thrust bearing 112 and a soft metal outer ring 114 mounted on a bronze filler 115, all of which are held together by an annular clamping member 116.

The input to the power brake unit includes a yoke member 118 above the shaft 28 having thrust portions 120 adapted to engage raised portions on the brake plate 64. The yoke member 118 is rockably supported in the walls of the casing part 16 by a bearing portion 122 on one side and by a rock shaft bearing portion 124 on the other side, at which side the rock shaft protrudes outwardly from the casing 16. The protruding end 125 of the rock shaft has secured thereto an input lever arm 126. The bearing portion 124 is mounted in bearing sleeve 125 positioned in casing 16 and provided with an oil seal 127 and cap piece 129. The bearing opening in the casing for pin 122 is closed by cap 131.

The output from the power brake unit includes a yoke member 128, the arms of which have thrust-receiving portions 130 disposed in substantially the same horizontal plane with but spaced radially inward from the thrust portion 120 of the yoke 118. The thrust receiving portions 130 are adapted to contact the thrust ring 114 of the output thrust collar at the forward ends of the spiral sleeves. The yoke 128 has a collar 132 keyed to the splines 134 of the output rock shaft 136 and the collar 132 is held against displacement along the rock shaft 136 by a pin 138 which extends through a boss 72 on casing part 16 to engage a slot 140 formed in the collar 132. The collar 132 also includes a depending arm 142 having a contact face 144 adapted to engage the front face 146 of the boss 72, as shown in dotted lines in Figure 2, to limit movement of the output means in an actuating direction. This prevents locking of or damage to the spiral sleeves upon excessive wear of the brake linings or breakage of the output linkage.

The output rock shaft 136 is supported at its ends by a boss 148 formed on one side of the casing 16 and a boss 150 formed on the other side of the casing part 16. The rock shaft 136 is held in place by a nut 152 screwed to the protruding end 154.

The nut 152 serves to retain a stamped lever arm 156 pressed by a spring element 158 into engagement with a washer 159 and an oil sealing washer 161 fitted in a groove of the boss 150 and pressed into contact with the surface of the rock shaft 136. The rock shaft 136 protrudes at its other end outside of the casing, as shown at 160, and has mounted thereon, with provision for lost motion a double arm lever 162 having oppositely extending arms 164 and 166 which may be connected to suitable brake rods or brake operating members.

The rock shaft 136 is formed with an enlargement 165 which, when the rock shaft is in position, presses against a sealing ring 167 mounted in a groove of the boss 148. The hub of the lever 162 is closed at its open end by a disk 168. The chamber 170 within the casing 16 is filled to a desired level with an oil suitable for lubrication of the free-wheeling unit and the power brake unit.

Figure 1:
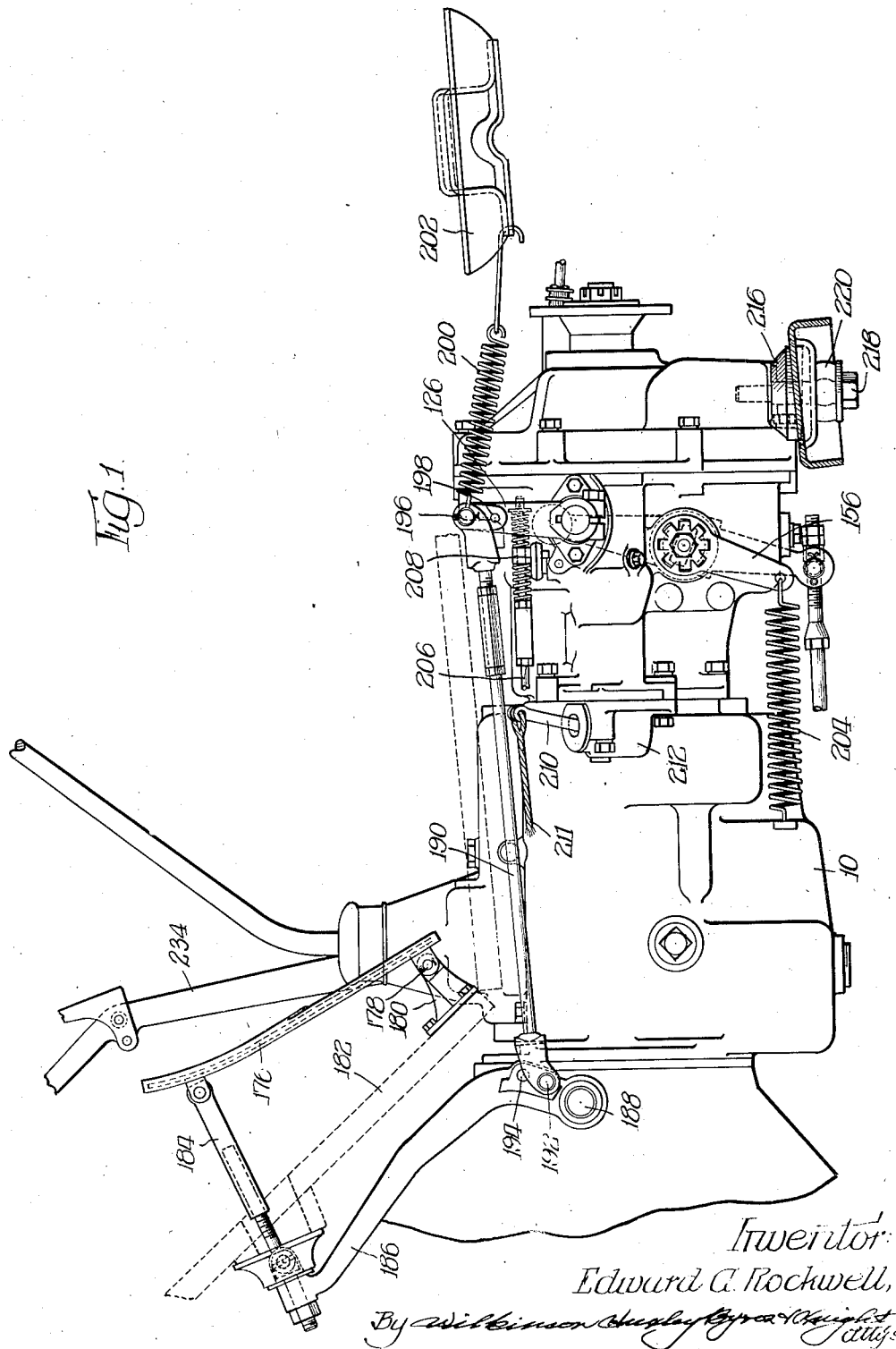

Referring to Figure 1, a brake pedal 176 is pivotally supported at 178 upon a bracket 180 mounted on the floor board 182. The upper end of the brake pedal has pivotally attached thereto an adjustable push rod 184 connected beneath the floor board to a lever 186, pivotally mounted at 188 upon the engine frame. The lever 186 is connected by pull rod 190 to the input lever arm 126 of the power brake unit. As shown, the pull rod 190 is connected to lever 186 at pivot 192 but a second connecting opening 194 is provided, which is spaced further from the axis of the pivot 188. Similarly the rod 190 is connected to input lever 126 at pivot 196 and a second connecting opening 198 is provided. By changing the points at which the pull rod 190 is respectively connected to the lever 196 and the input lever 126, the range and action of the brake pedal may be somewhat modified to suit the desires of the operator. The pedal-controlled linkage is held in normal released position by the pull back spring 200 extending between the input lever 126 and a part of the chassis frame, indicated at 202.

As shown in Figure 1, the lever arm 156, which is fixed to the output rock shaft 136, is held in normal released position by a stiff pull back spring 204 attached at one end to the transmission casing 10. A fairly stiff return spring is required, particularly in cold weather, in order to fully release the power brake parts and return the spiral sleeves to their normal positions. However, as will be later described the operator does not need to pull through this stiff spring 204 in applying the brakes by the emergency lever.

The free wheeling controls are illustrated in Figure 1. A rod 206 extends from a clutch pedal (not shown) to the lever arm 208 which is connected to a locking pin (not shown), which cooperates with the shift rod (not shown) for the free wheeling gear 64. The lever 210 is manually operated by a cable control 211. Assuming the parts to be in free wheeling position, the gear 64 in Figure 3 will be disengaged from the gear 58 and in order to change to conventional drive, the operator releases the clutch, thereby transmitting movement to rod 126, to lever 208 and releasing the shift rod for gear 64. Thereupon the lever 210 is moved by the cable control 211 in order to directly move the gear shift rod against the force of a return spring (not shown). When the gear 64 has become fully engaged with the gear 58, the parts will be locked in position until the operator again desires to shift back to free wheeling. As shown in Figure 1, the lever 208 is directly associated with the power brake casing and the lever 210 is partially enclosed by a housing 212, fixed to the power brake housing.

Figure 2:
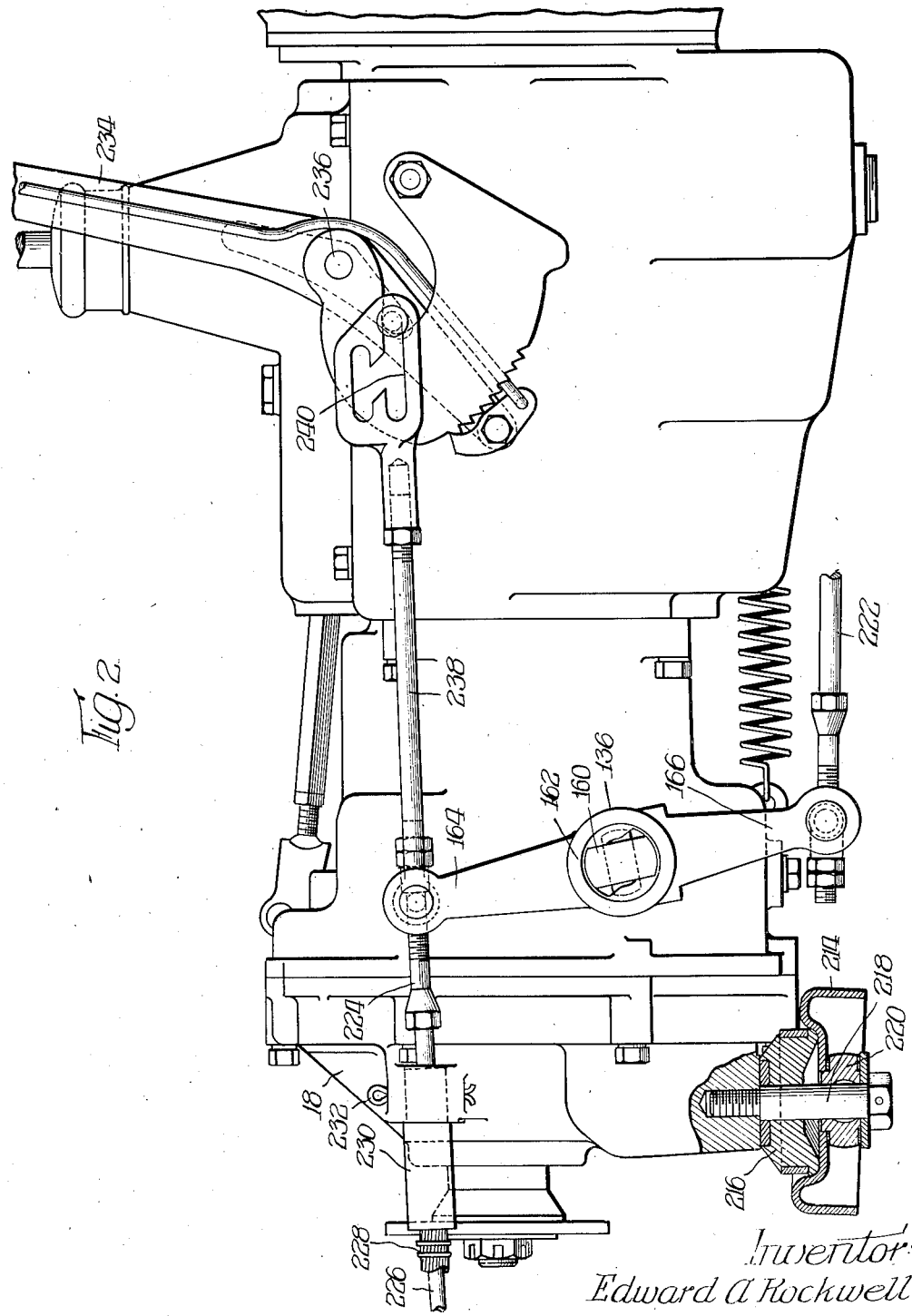
Figure 2 is an elevation of the power brake unit taken from the other side and shown partially in section.

Figures 1 and 2 also disclose a support for the rear end of the power brake casing. A cross member 214 is a part of the chassis frame, having mounted thereon a rubber block 216, upon which rests the rear end of the power brake casing. The brake casing is held down against the rubber block 216 by a bolt 218 threaded into the power brake casing, there being a rubber block 220 between the head of the bolt and the brace 214. The power brake casing is free to have a slight movement in a vertical direction due to the resiliency of the rubber blocks 216 and 220.

Figure 2 illustrates the manner in which the output of the power brake is connected to the wheel brakes and also the emergency lever connections for applying the wheel brakes. As previously stated, the lever 162 is mounted on output rock shaft 136 with provision for lost motion. The depending lever arm 166 is connected by a pull rod 222 to the front wheel brakes. The upwardly directed lever arm 164 has pivotally fastened thereto a connection 224 to which is secured a tension transmitting cable 226, which passes through flexible conduit 228 having an abutment 230 fastened to the cover 18 of the power brake casing by pin 232. The emergency lever 234 is pivoted at 236 and is connected by lost motion link 238 to lever arm 164. The provisions of the slots 240 in the link 238 need not be fully described herein, since this feature is disclosed and claimed in the Evans and Rockwell application Serial No. 571,050, filed October 26, 1931.

The construction and operation of the power brake unit, except for the improvements suitably pointed out above, is substantially the same as the disclosure in Rockwell Patent No. 1,896,377, issued February 7, 1933.

I claim:

1. In a power brake unit a casing, an output rock shaft rockably supported by the side walls of said casing, a yoke-shaped member mounted on said rock shaft within said casing and keyed to said rock shaft against relative rotation with respect thereto, and a pin extending through the bottom wall of said casing and engaging said yoke member to prevent lateral displacement with respect to said rock shaft.

2. In a power brake unit a casing, an output rock shaft pivotally supported by the side walls of said casing, a yoke member mounted on said rock shaft within said casing and keyed thereto against relative rotation, said casing having an abutment formed thereon and said yoke member having a depending portion adapted to act as a stop to limit movement of said rock shaft by engaging said casing abutment.

3. In a power brake system for motor vehicles, a mechanical power brake unit associated with the propeller shaft at the rear of the transmission, an input rock shaft for said power unit, an output rock shaft for said power unit, a brake lever mounted on said output rock shaft with provision for lost motion, resilient means acting upon said output rock shaft to normally hold said output rock shaft in released position independent of movement of said brake lever and manually operable means for actuating said brake lever independent of said output rock shaft.

4. In a power brake linkage for motor vehicles, a mechanical power brake unit associated with the propeller shaft of the vehicle at the rear of the transmission, an input rock shaft associated with said power brake unit, an output rock shaft associated with said power brake unit, a lever arm fixed to one end of said output rock shaft on the exterior of said power brake unit, resilient means acting upon said lever arm to normally hold said output rock shaft in released position, a brake lever mounted upon the other end of said output rock shaft on the exterior of said power brake unit with provision for lost motion and manually operable means for actuating said lever independent of said output rock shaft.

EDWARD A. ROCKWELL.